United States Patent
Hedrick et al.

(10) Patent No.: US 12,247,512 B1
(45) Date of Patent: Mar. 11, 2025

(54) ANTI-LAG CONTROLLED IGNITION SYSTEM

(71) Applicant: GM Global Technology Operations LLC, Detroit, MI (US)

(72) Inventors: Jacob C. Hedrick, Shelby Township, MI (US); Michael D. Locascio, Horse Shoe, NC (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/506,455

(22) Filed: Nov. 10, 2023

(51) Int. Cl.
*F02B 37/12* (2006.01)
*F02B 37/20* (2006.01)
*F02D 41/00* (2006.01)

(52) U.S. Cl.
CPC ............ *F02B 37/12* (2013.01); *F02B 37/20* (2013.01); *F02D 41/0007* (2013.01); *F02B 2037/122* (2013.01)

(58) Field of Classification Search
CPC .... F02B 37/12; F02B 2037/122; F02B 37/20; F02D 41/0007
See application file for complete search history.

(56) References Cited

U.S. PATENT DOCUMENTS

| 6,729,124 B2 * | 5/2004 | Baeuerle ............... F02P 15/02 60/285 |
| 2002/0040692 A1 * | 4/2002 | LaPointe ............. F02D 19/0647 123/431 |
| 2016/0003180 A1 | 1/2016 | McNulty et al. |

FOREIGN PATENT DOCUMENTS

| JP | 2017180195 A | 10/2017 |
| WO | WO-2009112056 A1 | 9/2009 |

* cited by examiner

*Primary Examiner* — Loren C Edwards
(74) *Attorney, Agent, or Firm* — Honigman LLP; Matthew H. Szalach; Jonathan P. O'Brien

(57) ABSTRACT

An anti-lag controlled ignition system includes an engine system including a turbocharger and an exhaust manifold fluidly coupled to the turbocharger. An electronic control unit (ECU) is communicatively coupled with the engine system and is configured to receive engine data from the engine system. A virtual optimization system is communicatively coupled with the ECU, and the virtual optimization system is configured to generate calibration tables in response to the engine data from the ECU. The ECU is configured to receive the generated calibration tables and is configured to reduce turbocharger lag via enthalpy calibrations for the exhaust manifold using one or more of the calibration tables.

20 Claims, 4 Drawing Sheets

ANTI-LAG CONTROLLED IGNITION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to an anti-lag controlled ignition system.

Anti-lag systems are typically used with turbocharged engines to minimize turbo lag. Typically, anti-lag systems utilize scavenging to recover energy from exhaust gases to maximize responsiveness at low engine speeds. The scavenging and subsequent burns occur in a cylinder of the engine in a conventional anti-lag system increasing the temperatures of other portions of the engine, such as the exhaust manifold. Often, the anti-lag system will scavenge the exhaust gases from the cylinder to provide more enthalpy per cycle.

SUMMARY

In some aspects, an anti-lag controlled ignition system for a vehicle includes exhaust gas having a flow rate, cylinders fluidly coupled with the exhaust gas, and an exhaust manifold operably coupled to the cylinders and fluidly coupled with the exhaust gas. A turbocharger fluidly coupled to the exhaust gas and the exhaust manifold. The anti-lag controlled ignition system also includes an electronic control unit (ECU) that includes data processing hardware and communicatively coupled to an engine system including the cylinders and the exhaust manifold. The engine system is configured to provide engine data to the ECU. A virtual optimization system is communicatively coupled with the ECU and includes an exhaust system model configured to generate calibration tables in response to and based on the engine data from the engine system. The ECU is configured to receive the generated calibration tables and is configured to reduce turbocharger lag via enthalpy calibrations for the exhaust manifold using one or more of the calibration tables.

In some examples, the engine data received by the exhaust system model may include one or more of an equivalence ratio of the exhaust gas, temperature data, oxidation data of the exhaust gas, and the flow rate of the exhaust gas. The temperature data may include a wall temperature of the exhaust manifold and a gas temperature of the exhaust gas. Optionally, the exhaust system model may be configured to model the oxidation data and may be configured to reduce turbocharger lag using the modeled oxidation data. In some configurations, the exhaust system model may be configured to increase combustion efficiency of the anti-lag controlled ignition system using the modeled oxidation data. In other examples, the ECU may be configured to execute one or more of the calibration tables, and the one or more calibration tables may include a spark-fuel-injection strategy. In some instances, the ECU may be configured to leverage the exhaust manifold as an ignition source.

In other aspects, an anti-lag controlled ignition system includes an engine system including cylinders, a turbocharger, and an exhaust manifold operably coupled to and disposed between the cylinders and the turbocharger. An electronic control unit (ECU) is communicatively coupled with the engine system and includes data processing hardware. The ECU is configured to receive oxidation data and temperature data from the engine system, and a virtual optimization system is communicatively coupled with the ECU. The virtual optimization system includes an exhaust system model configured to generate calibration tables in response to the oxidation data and the temperature data from the ECU. The ECU is configured to receive the generated calibration tables and is configured to alter a speed of the turbocharger at the exhaust manifold via enthalpy calibrations using one or more of the calibration tables.

In some examples, the ECU may be configured to leverage a wall temperature of the exhaust manifold to alter the speed of the turbocharger using the enthalpy calibrations. In some instances, the exhaust system model may be configured to receive engine data from the ECU that may include the oxidation data, the temperature data, an equivalence ratio, and a flow rate. The temperature data may include a wall temperature of the exhaust manifold and a gas temperature of exhaust gas of the engine system. Optionally, the exhaust system model may be configured to model the oxidation data, and the ECU may be configured to reduce turbocharger lag using the modeled oxidation data. The exhaust system model may be configured to increase combustion efficiency of the engine system using the modeled oxidation data. In some configurations, the ECU may be configured to execute one or more of the calibration tables, and the one or more calibration tables may include a spark-fuel-injection strategy.

In yet other aspects, an anti-lag controlled ignition system includes an engine system including a turbocharger and an exhaust manifold fluidly coupled to the turbocharger. An electronic control unit (ECU) is communicatively coupled with the engine system and is configured to receive engine data from the engine system. A virtual optimization system is communicatively coupled with the ECU, and the virtual optimization system is configured to generate calibration tables in response to the engine data from the ECU. The ECU is configured to receive the generated calibration tables and is configured to reduce turbocharger lag via enthalpy calibrations for the exhaust manifold using one or more of the calibration tables.

In some examples, the engine data may include temperature data and oxidation data, and the virtual optimization system may be configured to generate the calibration tables to identify a limited target temperature of the exhaust manifold. Optionally, the virtual optimization system may include an exhaust system model configured to model the oxidation data and may include the modeled oxidation data in the generated calibration tables. The ECU may be configured to reduce turbocharger lag using the modeled oxidation data and may be configured to increase combustion efficiency of the engine system using the modeled oxidation data. In some instances, the ECU may be configured to execute one or more of the calibration tables, the one or more calibration tables including a spark-fuel-injection strategy. Optionally, the ECU may be configured to leverage a wall temperature of the exhaust manifold to alter a speed of the turbocharger using the enthalpy calibrations.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
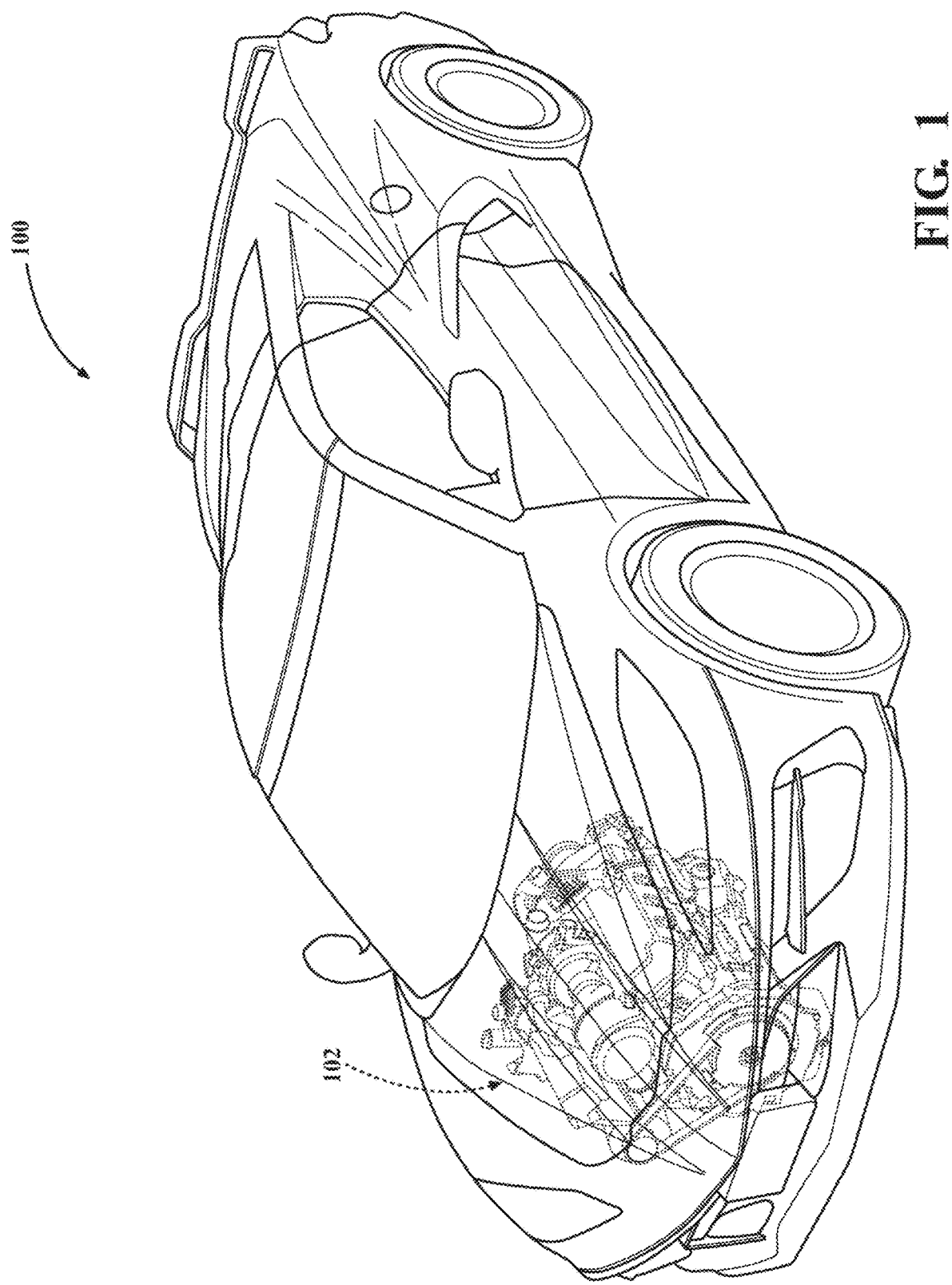
FIG. 1 is a perspective view of an example vehicle including an anti-lag controlled ignition system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising." "including." and "having." are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app." or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry. e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Referring to FIGS. 1-4, a vehicle 100 includes an engine system 102 controlled by an anti-lag controlled ignition system 10 that is configured to model oxidation within the engine system 102 to harness heat within the engine system 102 and improve the speed of the vehicle 100, as described in more detail below: The engine system 102 includes a turbocharger 104 fluidly coupled with cylinders 106 and an exhaust manifold 108. The engine system 102 cycles a fuel mixture 110a to be burned, primarily, in the cylinders 106 to produce exhaust gas 110. The fuel mixture 110a includes a combination of fuel and air. The exhaust gas 110 may contain the residual fuel mixture 110a including residual fuel and air that passes from the cylinders 106 to the exhaust manifold 108. Ultimately, the exhaust gas 110 is directed toward a turbine 112 of the turbocharger 104, which is configured to extract energy, or enthalpy, to power a compressor 114 of the turbocharger 104.

The residual fuel mixture 110a including residual fuel and air of the exhaust gas 110 may be harnessed by the engine system 102 to generate additional, free energy for the turbine 112 by burning the oxidizable component of exhaust gas 110 within the exhaust manifold 108, as described herein. This process results in increased energy available for the turbine 112 of the turbocharger 104 and, thus, provides the turbine 112 with maximized energy capture to power the compressor 114. The burning of the exhaust gas 110 within the exhaust manifold 108, described in more detail below, is determined by the anti-lag controlled ignition system 10 through modeling of oxidation within the exhaust manifold 108. The harnessing of the exhaust gas 110 within the exhaust manifold 108 may provide an added advantage of improving the overall combustion efficiency of the engine system 102 by maximizing the combustion potential of the exhaust gas within the engine system 102.

Figure 2:
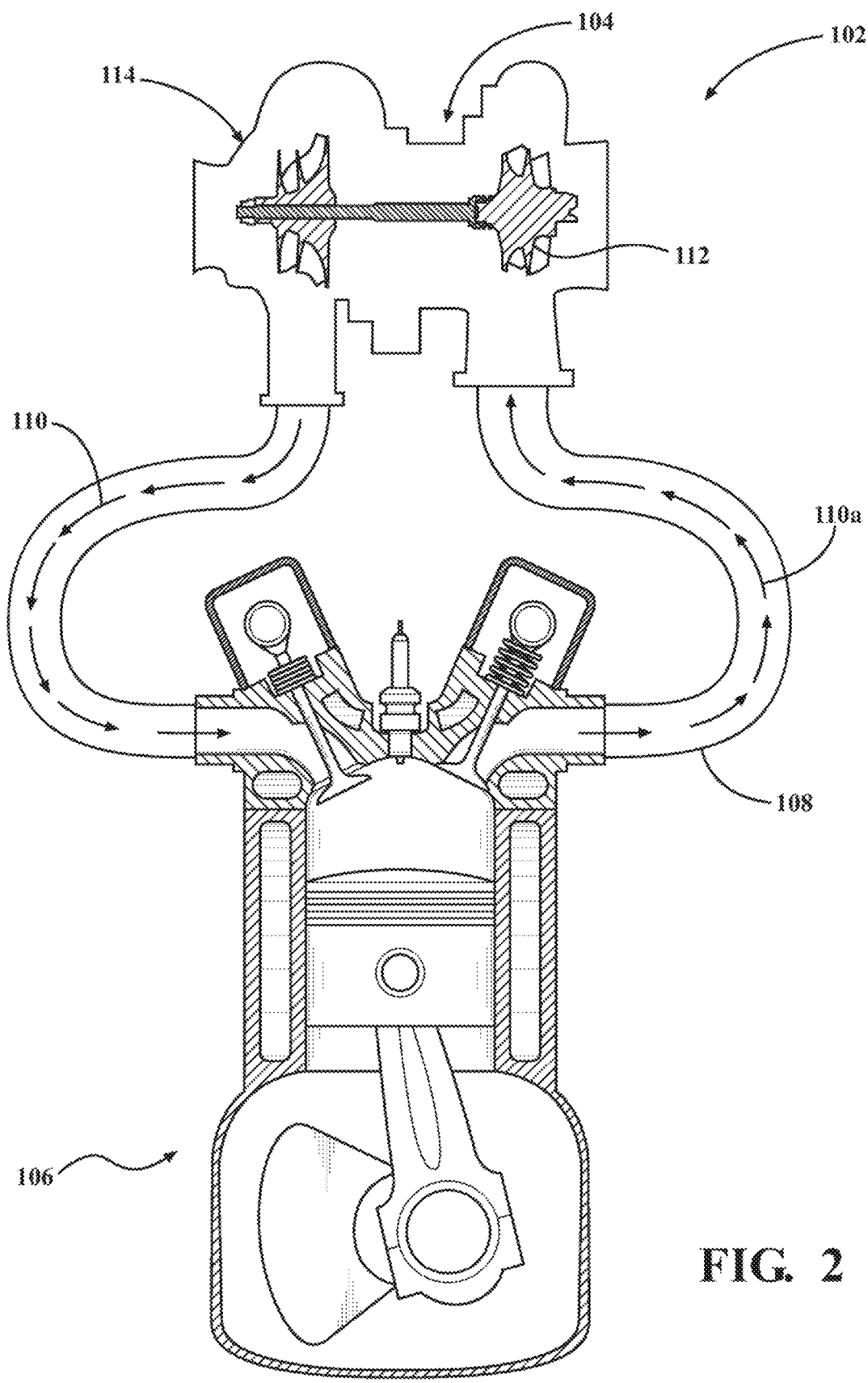
FIG. 2 is a schematic of an engine system according to the present disclosure.
Figure 3:
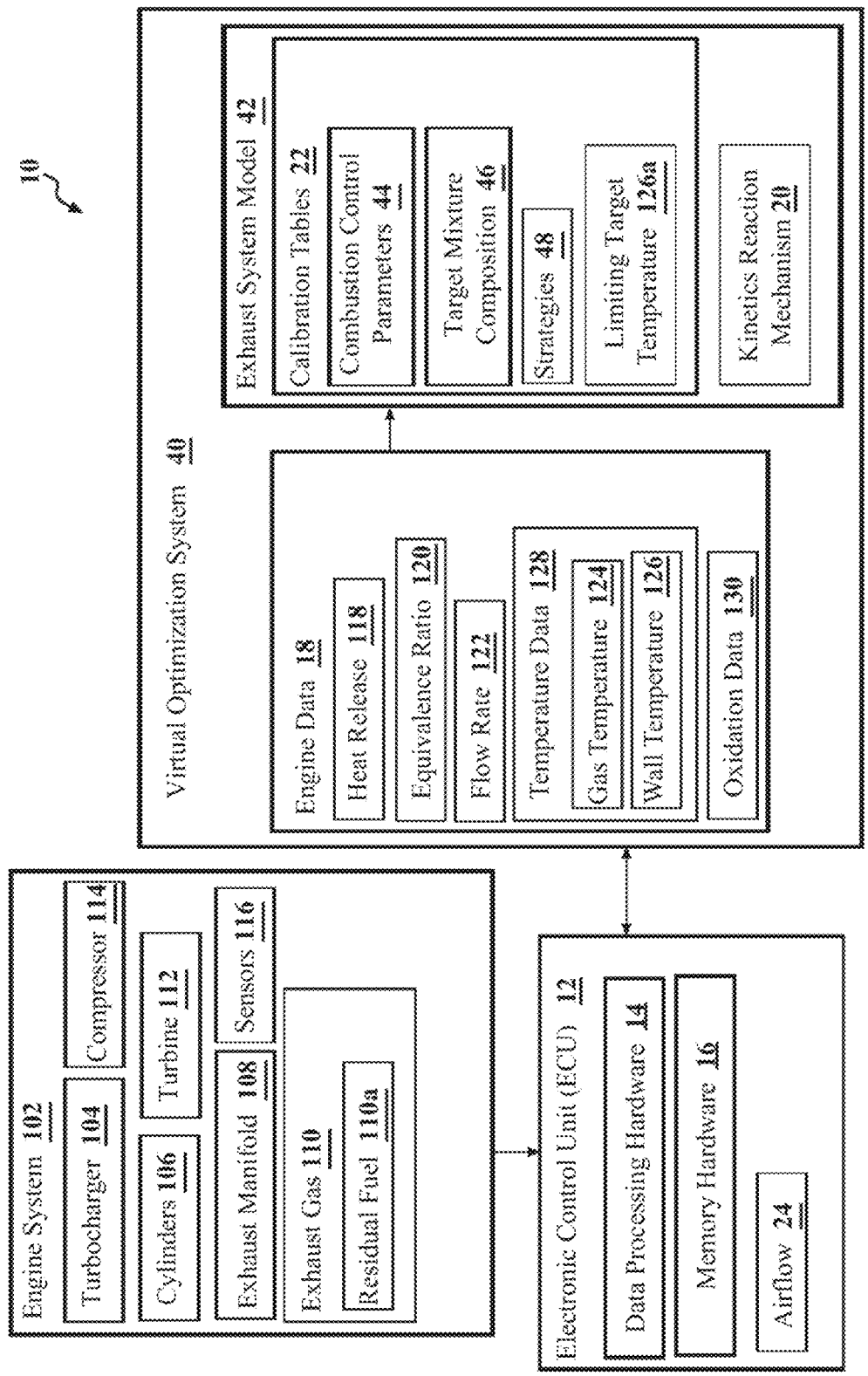
FIG. 3 is a block diagram of an anti-lag controlled ignition system according to the present disclosure.

With further reference to FIGS. 1-3, the engine system 102 may be calibrated with an electronic control unit (ECU) 12 of the vehicle 100 that is utilized as part of the anti-lag controlled ignition system 10. The ECU 12 includes data processing hardware 14 and memory hardware 16 that cooperate with sensors 116 of the engine system 102 to gather engine data 18. For example, the ECU 12 monitors a fuel mass that is utilized within the engine system 102 and determines a volume of exhaust gas 110 within the engine system 102 after in-cylinder combustion. The volume of exhaust gas 110 may include an exhaust equivalence ratio 120, described below; that may reflect the residual fuel mixture 110a (i.e., residual fuel and air) of the exhaust gas 110.

The ECU 12 also monitors, via the engine data 18, a flow rate 122 and gas temperature 124 of the exhaust gas 110. The sensors 116 also detect a wall temperature 126 of the exhaust manifold 108. Each of the heat release 118, the equivalence ratio 120, the flow rate 122, the gas temperature 124, and the wall temperature 126 may be categorized as the engine data 18 captured by the sensors 116 and stored in the memory hardware 16 of the ECU 12. The gas temperature 124 and the wall temperature 126 may collectively be stored as temperature data 128 within the memory hardware 16. The memory hardware 16 may be regularly updated with the engine data 18 during operation of the engine system 102 via the data processing hardware 14.

Referring still to FIGS. 1-3, the fuel mixture 110a is initially combusted within the cylinders 106, which results in the heat release 118 from the in-cylinder combustion. The heat release 118 may be dependent upon the chemical composition of the exhaust gas 110 in the cylinders 106 and, subsequently, the exhaust manifold 108. While a majority of the fuel mixture 110a is combusted, or burned, within the cylinders 106, the exhaust gas 110 expelled from the cylinders 106 may contain some residual fuel mixture 110a, as mentioned above. The residual fuel mixture 110a is calculated via the ECU 12, after combustion within the cylinders 106, to determine the equivalence ratio 120. The equivalence ratio 120 reflects the stoichiometric condition of the exhaust gas 110 and is utilized by the anti-lag controlled ignition system 10 to model the oxidation within the exhaust manifold 108, described in more detail below: In addition to the equivalence ratio 120, the anti-lag controlled ignition system 10 may also receive oxidation data 130 from the ECU 12. The oxidation data 130 is related to the residual air contained in the exhaust gas 110 and may be used by the anti-lag controlled ignition system 10 when modeling the oxidation within the exhaust manifold 108.

The exhaust manifold 108 has a high temperature associated with the metallic composition of the walls of the exhaust manifold 108. The high temperature of the exhaust manifold 108 is captured as the wall temperature 126, mentioned above, and may be monitored for a peak temperature. As a result of the high temperature, the exhaust gas 110 may undergo additional combustion reactions within the exhaust manifold 108, which is determined by the anti-lag controlled ignition system 10 and executed by the ECU 12. The anti-lag controlled ignition system 10 utilizes the exhaust manifold 108 to achieve complete combustion of the residual fuel mixture 110a of the exhaust gas 110 by reacting with the residual air (i.e., oxygen) and harnessing the wall temperature 126 of the exhaust manifold 108 for activation energy.

An engine system model 42 utilizes a kinetics reaction mechanism 20 to evaluate a performance of the engine system 102 while solving for the oxidation of the exhaust gas 110 at a correlated level of fidelity to the engine data 18 based on the wall temperature 126, the gas temperature 124, the residual fuel and oxygen 110a, and the equivalence ratio 120 of the exhaust gas 110. The calibration tables 22 may be generated by various physics-based predictive models that may correlate the gas temperature 124 and the wall temperature 126, as well as unseen data. In addition, the anti-lag controlled ignition system 10 utilizes the flow rate 122 of the exhaust gas 110 to determine an airflow 24 within the exhaust manifold 108 for optimized, complete combustion. The exhaust gas 110, including the residual fuel mixture 110a (i.e., residual fuel and air), is burned within the exhaust manifold 108 based on calibration tables 22 generated as part of the anti-lag controlled ignition system 10, described below; to achieve complete combustion.

Figure 4:
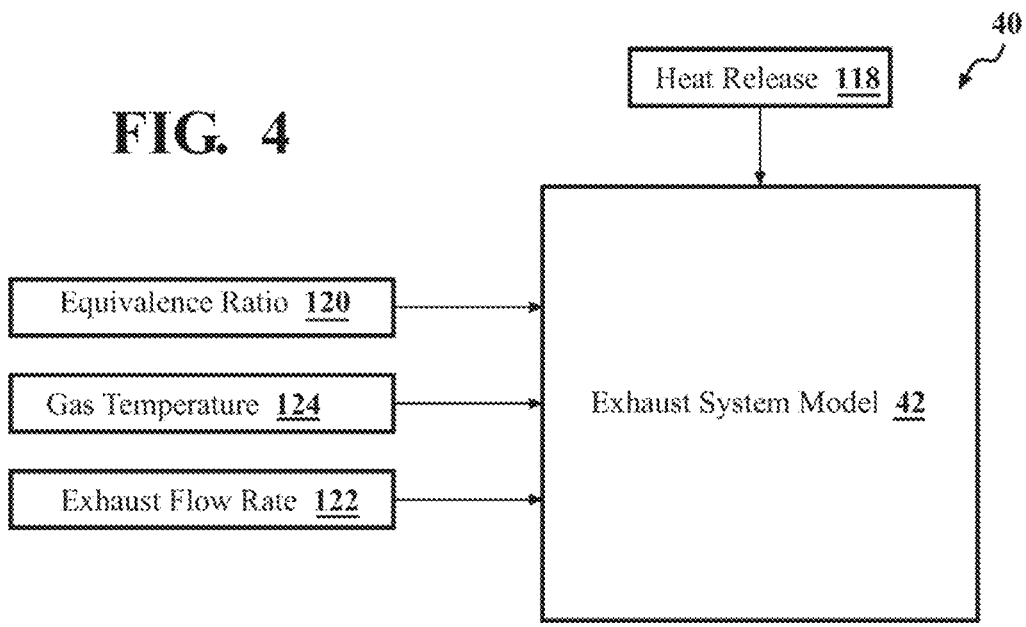
FIG. 4 is a schematic block diagram of an anti-lag controlled ignition system according to the present disclosure with an exhaust system receiving inputs.
Figure 5:
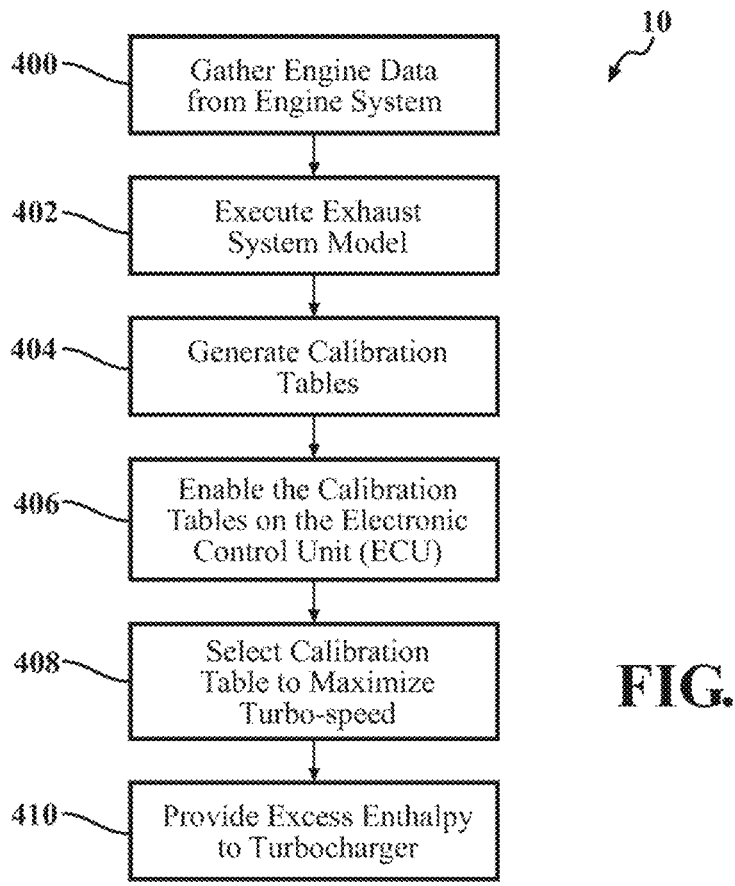
FIG. 5 is an example flow diagram for an anti-lag controlled ignition system according to the present disclosure.

With reference to FIGS. 2-4, the anti-lag controlled ignition system 10 further includes a virtual optimization system 40 that is configured to generate the calibration tables 22 for the ECU 12 and engine system 102. The virtual optimization system 40 includes the exhaust system model 42 that may be utilized to generate the calibration tables 22 based on the engine data 18 received from the ECU 12. In other examples, the exhaust system model 42 may receive the engine data 18 from an engine performance model, which is physics-based and predictive. In one example illustrated in FIG. 4, the exhaust system model 42 receives the equivalence ratio 120, the gas temperature 124, and the flow rate 122 of the exhaust gas 110. The exhaust system model 42 is configured to determine an optimized combustion of the exhaust gas 110 within the exhaust manifold 108 based on the engine data 18. In addition, the exhaust system model 42 utilizes the oxidation data 130, the wall temperature 126 of the exhaust manifold 108, and a desired speed output of the turbocharger 104.

The exhaust system model 42 may be developed by the virtual optimization system 40) as a three-dimensional model that may be blocked into one-dimension to capture the interface between the exhaust gas 110 and the exhaust manifold 108. For example, the virtual optimization system 40 may utilize a three-dimensional or one-dimensional computational fluid dynamics code with a conjugate heat transfer model to solve for a target exhaust gas flow rate, thermodynamic performance, and structural temperatures. The virtual optimization system 40 is configured to, ultimately, provide a one-dimensional exhaust system model 42 designed to imitate a detailed chemical kinetic mechanism of the engine system 102 to provide time-feasible control designs and feedback via the calibration tables 22. Thus, the one-dimensional exhaust system model 42 imitates a more detailed mechanism by using a smaller, even single-step, mechanism to an acceptable approximation of the detailed results. In developing the calibration tables 22, the exhaust system model 42 determines a burn duration of the exhaust gas 110 relative to a defined temperature.

The defined temperature may, in some examples, correspond to the wall temperature 126 of the exhaust manifold 108. The burn duration of the exhaust gas 110 may be modeled relative to the wall temperature 126 on a log scale versus the reciprocal of the wall temperature 126 to define a linear trend. Thus, the exhaust system model 42 may have a correlation of auto-ignition time based on the modeled burn duration. The correlation and the modeled burn duration may be incorporated as part of one or more of the calibration tables 22 for use with the engine system 102 via the ECU 12, as described below: The modeled burn duration incorporated in the calibration tables 22 may assist in reducing the real-time reaction mechanism of the engine system 102, which may assist in maximizing the speed of the engine system 102 as a whole.

The exhaust system model 42 may further utilize the temperature data 128 to control the conditions of the heat release 118 by, for example, comparing the equivalence ratio 120) with the temperature data 128 and the flow rate 122 of the exhaust gas 110. For example, the exhaust system model 42 may identify a viable temperature for post-cylinder oxidation from the temperature data 128 of the exhaust manifold 108, which may be utilized in generating a calibration table 22 that includes combustion control parameters 44. The calibration table 22 may also include exhaust manifold temperature estimations based, at least in part, on the wall temperature of the exhaust manifold 108 received from the ECU 12. The calibration tables 22 are provided to the ECU 12 from the virtual optimization system 40 for execution by the engine system 102 within the exhaust manifold 108, pre-turbine 112.

Thus, the engine system 102 may execute additional heat release 118 within the exhaust manifold 108 before the exhaust gas 110 reaches the turbine 112 of the turbocharger 104. The added heat release 118 advantageously increases the energy available for the turbocharger 104. Thus, the turbine 112 has increased energy available, which results in an anti-lag effect and increased efficiency of the engine system 102. The engine system 102 utilizes the added energy resulting from the burning of the exhaust gas 110 within the exhaust manifold 108 to sustain the reactions within the engine system 102 and control an instantaneous manifold energy to a limiting target temperature 126a of the exhaust manifold 108. For example, the temperature 126 of the exhaust manifold 108 decreases over time, so the engine system 102 is calibrated, via the calibration tables 22, to operate to a minimum limited target temperature 126a of the exhaust manifold 108. The limited target temperature 126a generally corresponds to the wall temperature 126 of the exhaust manifold 108 as the exhaust manifold 108 cools after the in-cylinder 106 combustion.

With further reference to FIGS. 2-4, the engine system 102 is repeatedly calibrated by the ECU 12 based on the calibration tables 22 generated by the exhaust system model 42 in the virtual optimization system 40 of the anti-lag controlled ignition system 10. The calibration tables 22 may include calibrations for various aspects of the engine system 102 including, but not limited to, injector calibrations, cam calibrations, and spark calibrations. The calibration tables 22 are utilized for combustion control within the exhaust manifold 108 by predicting an exotherm from excess or stoichiometric fueling conditions of the engine system 102. For example, the injector and cam calibrations may be utilized to control kinetically limited open flow reactions within the exhaust manifold 108 and cylinders 106 by targeting a range of gas temperatures 124 of the exhaust gas 110 and wall temperatures 126 of the exhaust manifold 108. The spark calibrations may be utilized to control the gas temperature 124 of the exhaust gas 110 after the in-cylinder combustion and entering the exhaust manifold 108. By calibrating the sparks, a pumping and mixing of the engine system 102 can be maintained while achieving the anti-lag function through burning of the exhaust gas 110 within the exhaust manifold 108.

The integration of the calibration tables 22 with the ECU 12 and the engine system improves the performance of the turbocharger 104 by increasing the overall speed of the turbocharger 104. For example, the turbocharger 104 may resume a boosting effect faster based upon the wall temperature 126 of the exhaust manifold 108. The exhaust system model 42 can be utilized to estimate various conditions of the engine system 102 to identify an optimized burn duration of the exhaust gas 110 and heat release 118 from one or both of the in-cylinder combustion and the exhaust manifold 108. In some examples, when the exhaust gas 110 is in a single environment for a period of time, the exhaust gas 110 releases a cumulative amount of enthalpy.

In execution, the one-dimensional application of the exhaust system model 42 would utilize dithering spark and inversely dithering a command airflow ratio for one or more cylinders 106 opposite another cylinder 106. In some three-dimensional examples, with respect to a multi-phase injection, a stratified charge can shift the combustion reaction by controlling the equivalence ratio 120 in the cylinder 106. Thus, the stratified charge may, through an exhaust stroke, promote mixing of the unburnt charge for oxidation in the exhaust manifold 108 based on the wall temperature 126 and the flow rates 122. This one-dimensional exhaust system model 42 would assist in maintaining a global stoichiometry for the engine system 102. The variances between the cylinders 106 utilizing the command airflow ratio and the global stoichiometry collectively assists in defining a target mixture composition 46 of the exhaust gas 110 and added airflow within the engine system 102. The target mixture composition 46 is designed by the exhaust system model 42 to promote additional heat release 118 within the exhaust manifold 108 to maximize the energy available to the turbine 112 of the turbocharger 104. For example, the additional heat release 118 assists in maintaining the energy available for the turbine 112.

Referring still to FIGS. 2-4, the engine system 102 is designed and calibrated by the ECU 12 based on the wall temperature 126 of the exhaust manifold 108. The wall temperature 126 should be sufficiently high so as to execute an auto-ignition and have a chemical-based oxidation of the residual fuel mixture 110a within the exhaust manifold 108. The exhaust system model 42 is configured to model the oxidation data 130 associated with the oxidation of the residual fuel mixture 110a. The calibration table 22 including the modeled oxidation data 130 is configured to reduce lag of the turbocharger 104 by using the modeled oxidation data 130 to maximize the amount of exhaust gas 110 burned in the exhaust manifold 108. The generated calibration tables 22 from the exhaust system model 42 provide the engine system 102 with the capability to continually, nominally increase the turbo-speed generated by the turbocharger 104. Thus, the increased turbo-speed is achieved through the oxidation within the exhaust manifold 108 during which the residual oxygen within the fuel mixture 110a is burned.

The calibration tables 22 are loaded onto the ECU 12 from the virtual optimization system 40 as part of the anti-lag controlled ignition system 10. The calibration tables 22 provide the ECU 12 with instructions and strategies to be executed using the engine system 102. The calibration tables 22 may be stored in the memory hardware 16 of the ECU 12 and may be leveraged by the data processing hardware 14 for implementation into the engine system 102. For example, the calibration tables 22 may provide a spark-fuel-injection strategy 48 that may be executed by the engine system 102. The calibration tables 22 are configured to provide the engine system 102 with a method of increased fuel combustion by leveraging the wall temperature 126 of the exhaust manifold 108 to burn the exhaust gas 110 within the exhaust manifold 108 using one or more strategies 48, such as the spark-fuel-injection strategy 48.

Thus, the ECU 12, through execution of one or more of the calibration tables 22, is configured to leverage the exhaust manifold 108 as an ignition source. The cylinders 106 are utilized as a primary ignition source of the engine system 102, as generally described above, and the exhaust manifold 108 may supplement the cylinders 106 by burning the residual fuel mixture 110a (i.e., residual fuel and air). For example, the ECU 12 may execute enthalpy calibrations using one or more of the calibration tables 22 to specify the burning of the exhaust gas 110 within the exhaust manifold 108 until the defined limited target temperature 126a is reached. During operation of the engine system 102, the wall temperature 126 of the exhaust manifold 108 reaches such high temperatures that the engine system 102 is able to achieve near complete combustion of the residual fuel mixture 110a of the exhaust gas 110.

With reference again to FIGS. 1-5, an example flow diagram of the anti-lag controlled ignition system 10 is illustrated. At 400, the exhaust system model 42 gathers the engine data 18 from the engine system 102 via the ECU 12.

The virtual optimization system 40 receives the engine data 18 and executes, at 402, the exhaust system model 42 for the anti-lag controlled ignition system 10. The exhaust system model 42 generates, at 404, calibration tables 22 for the engine system 102, and the ECU 12, at 406, enables the calibration tables 22 to be used with the engine system 102. The ECU 12, at 408, can select the calibration table 22 that will maximize the turbo-speed based on the engine data 18. As a result, the anti-lag controlled ignition system 10 provides, at 410, excess enthalpy to the turbocharger 104 resulting in the maximized turbo-speed.

The anti-lag controlled ignition system 10 is advantageously designed to minimize lag associated with the turbocharger 104 and may also increase the overall efficiency of the engine system 102 as a result. The minimized lag of the turbocharger 104 is achieved by the virtual optimization system 40 executing the exhaust system model 42. Specifically, the modeling of the oxidation data 130 from the exhaust manifold 108 pertaining to the exhaust gas 110 is utilized in generating the calibration tables 22. The generated calibration tables 22 are incorporated into the ECU 12 and may be stored in the memory hardware 16. Thus, the calibration tables 22 are static tables incorporated into the ECU 12. While the calibration tables 22 are pre-executed by the exhaust system model 42, if there was a physical temperature measurement as feedback, a closed-loop control routine may be utilized to learn potential offsets that may be unique to the engine system 102 (i.e., unique injector performance or component aging, such as spark plug fowling or electrode gap growth).

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An anti-lag controlled ignition system for a vehicle including exhaust gas having a flow rate, the anti-lag controlled ignition system comprising:
    an engine system including cylinders fluidly coupled with the exhaust gas, an exhaust manifold operably coupled to the cylinders and fluidly coupled with the exhaust gas, and a turbocharger fluidly coupled to the exhaust gas and the exhaust manifold;
    an electronic control unit (ECU) including data processing hardware and communicatively coupled to the engine system, the engine system configured to provide engine data to the ECU, the engine data including flow rate of the exhaust gas and an equivalence ratio of the exhaust gas; and
    a virtual optimization system communicatively coupled with the ECU, the virtual optimization system including an exhaust system model configured to generate calibration tables in response to and based on the engine data from the engine system including generating the calibration tables in response to and based on each of the flow rate of the exhaust gas and the equivalence ratio of the exhaust gas, the ECU being configured to receive the generated calibration tables and being configured to reduce turbocharger lag via enthalpy calibrations for the exhaust manifold using one or more of the calibration tables.

2. The anti-lag controlled ignition system of claim 1, wherein the engine data received by the exhaust system model includes one or more of temperature data and oxidation data of the exhaust gas.

3. The anti-lag controlled ignition system of claim 2, wherein the temperature data includes a wall temperature of the exhaust manifold and a gas temperature of the exhaust gas.

4. The anti-lag controlled ignition system of claim 2, wherein the exhaust system model is configured to model the oxidation data and is configured to reduce the turbocharger lag using the modeled oxidation data.

5. The anti-lag controlled ignition system of claim 4, wherein the exhaust system model is configured to increase combustion efficiency of the anti-lag controlled ignition system using the modeled oxidation data.

6. The anti-lag controlled ignition system of claim 1, wherein the ECU is configured to execute one or more of the calibration tables, the one or more calibration tables including a spark-fuel-injection strategy.

7. The anti-lag controlled ignition system of claim 1, wherein the ECU is configured to leverage the exhaust manifold as an ignition source.

8. An anti-lag controlled ignition system comprising:
    an engine system including cylinders, a turbocharger, and an exhaust manifold operably coupled to and disposed between the cylinders and the turbocharger;
    an electronic control unit (ECU) communicatively coupled with the engine system and including data processing hardware, the ECU configured to receive oxidation data and temperature data from the engine system; and
    a virtual optimization system communicatively coupled with the ECU, the virtual optimization system including an exhaust system model configured to generate calibration tables in response to and based on each of the oxidation data, the temperature data from the ECU, a flow rate of exhaust gas of the engine system, and an equivalence ratio of the exhaust gas, the ECU being configured to receive the generated calibration tables and being configured to alter a speed of the turbocharger at the exhaust manifold via enthalpy calibrations using one or more of the calibration tables.

9. The anti-lag controlled ignition system of claim 8, wherein the ECU is configured to leverage a wall temperature of the exhaust manifold to alter the speed of the turbocharger using the enthalpy calibrations.

10. The anti-lag controlled ignition system of claim 8, wherein the exhaust system model is configured to receive engine data from the ECU including the oxidation data and the temperature data.

11. The anti-lag controlled ignition system of claim 10, wherein the temperature data includes a wall temperature of the exhaust manifold and a gas temperature of the exhaust gas of the engine system.

12. The anti-lag controlled ignition system of claim 10, wherein the exhaust system model is configured to model the oxidation data and the ECU is configured to reduce turbocharger lag using the modeled oxidation data.

13. The anti-lag controlled ignition system of claim 12, wherein the exhaust system model is configured to increase combustion efficiency of the engine system using the modeled oxidation data.

14. The anti-lag controlled ignition system of claim 8, wherein the ECU is configured to execute one or more of the calibration tables, the one or more calibration tables including a spark-fuel-injection strategy.

15. An anti-lag controlled ignition system comprising:
an engine system including a turbocharger and an exhaust manifold fluidly coupled to the turbocharger;
an electronic control unit (ECU) communicatively coupled with the engine system, the ECU configured to receive engine data from the engine system, the engine data including flow rate of an exhaust gas of the engine system and an equivalence ratio of the exhaust gas; and
a virtual optimization system communicatively coupled with the ECU, the virtual optimization system configured to generate calibration tables in response to and based on the engine data from the ECU including generating the calibration tables in response to and based on each of the flow rate of the exhaust gas and the equivalence ratio of the exhaust gas, the ECU being configured to receive the generated calibration tables and being configured to reduce turbocharger lag via enthalpy calibrations for the exhaust manifold using one or more of the calibration tables.

16. The anti-lag controlled ignition system of claim 15, wherein the engine data includes temperature data and oxidation data, the virtual optimization system configured to generate the calibration tables to identify a limited target temperature of the exhaust manifold.

17. The anti-lag controlled ignition system of claim 16, wherein the virtual optimization system includes an exhaust system model configured to model the oxidation data and include the modeled oxidation data in the generated calibration tables.

18. The anti-lag controlled ignition system of claim 17, wherein the ECU is configured to reduce the turbocharger lag using the modeled oxidation data and is configured to increase combustion efficiency of the engine system using the modeled oxidation data.

19. The anti-lag controlled ignition system of claim 15, wherein the ECU is configured to execute one or more of the calibration tables, the one or more calibration tables including a spark-fuel-injection strategy.

20. The anti-lag controlled ignition system of claim 15, wherein the ECU is configured to leverage a wall temperature of the exhaust manifold to alter a speed of the turbocharger using the enthalpy calibrations.

* * * * *